(12) United States Patent
Arndt et al.

(10) Patent No.: US 12,084,588 B2
(45) Date of Patent: Sep. 10, 2024

(54) MULTI-COMPONENT COMPOSITION FOR ADDITIVE MANUFACTURING

(71) Applicant: Formlabs, Inc., Somerville, MA (US)

(72) Inventors: Eric Arndt, Everett, MA (US); Luke Kwisnek, Somerville, MA (US); Michael Morin, Somerville, MA (US)

(73) Assignee: Formlabs, Inc., Somerville, MA (US)

( * ) Notice: Subject to any disclaimer, the term of this patent is extended or adjusted under 35 U.S.C. 154(b) by 132 days.

(21) Appl. No.: 17/558,850

(22) Filed: Dec. 22, 2021

(65) Prior Publication Data

US 2022/0195236 A1  Jun. 23, 2022

Related U.S. Application Data

(60) Provisional application No. 63/129,785, filed on Dec. 23, 2020.

(51) Int. Cl.

| | |
|---|---|
| *C08F 2/46* | (2006.01) |
| *B29C 64/30* | (2017.01) |
| *B33Y 40/20* | (2020.01) |
| *B33Y 70/00* | (2020.01) |
| *C08F 2/50* | (2006.01) |
| *C08G 59/17* | (2006.01) |
| *C08G 59/24* | (2006.01) |
| *C08G 59/40* | (2006.01) |
| *C08G 59/68* | (2006.01) |
| *C08G 61/04* | (2006.01) |
| *C09D 163/10* | (2006.01) |
| *B29K 63/00* | (2006.01) |

(52) U.S. Cl.
CPC ............ *C09D 163/10* (2013.01); *B29C 64/30* (2017.08); *B33Y 40/20* (2020.01); *B33Y 70/00* (2014.12); *C08G 59/1466* (2013.01); *C08G 59/245* (2013.01); *C08G 59/4028* (2013.01); *C08G 59/685* (2013.01); *B29K 2063/00* (2013.01)

(58) Field of Classification Search
CPC ......... B29C 64/10; B29C 64/30; B33Y 70/00; B33Y 10/00; B33Y 40/20; C09D 163/10; B29K 2063/00; C08G 59/685; C08G 59/1466; C08G 59/245; C08G 59/4028; C08L 63/00; C08K 5/10; C08K 5/315
USPC ................ 522/64, 6, 189, 184, 71, 1; 520/1
See application file for complete search history.

(56) References Cited

U.S. PATENT DOCUMENTS

| | | |
|---|---|---|
| 9,422,412 B2 | 8/2016 | Yu et al. |
| 9,708,440 B2 | 7/2017 | Das et al. |
| 9,873,761 B1 | 1/2018 | Das et al. |
| 10,471,655 B2 | 11/2019 | Menyo et al. |
| 2022/0145019 A1* | 5/2022 | Grover .................. C08F 285/00 |

FOREIGN PATENT DOCUMENTS

| | | | | |
|---|---|---|---|---|
| WO | WO-2017040883 A1 * | 3/2017 | ........... | B29C 64/124 |
| WO | WO-2020205212 A1 * | 10/2020 | ........... | B29C 64/124 |

* cited by examiner

*Primary Examiner* — Jessica Whiteley
(74) *Attorney, Agent, or Firm* — Wolf, Greenfield & Sacks, P.C.

(57) ABSTRACT

A multi-component composition for additive manufacturing, and related methods, are generally described.

11 Claims, 7 Drawing Sheets

MULTI-COMPONENT COMPOSITION FOR ADDITIVE MANUFACTURING

CROSS REFERENCE TO RELATED APPLICATIONS

The present application claims the benefit under 35 U.S.C. § 119(e) of U.S. Provisional Patent Application No. 63/129,785, filed Dec. 23, 2020, titled "Multi-Component Composition for Additive Manufacturing," which is hereby incorporated by reference in its entirety.

BACKGROUND

Additive manufacturing techniques, such as three-dimensional (3D) printing, may be used to fabricate objects by causing portions of a building material to solidify at specific locations and subsequently forming successive layers on top of the solidified materials. Stereolithography, for example, successively forms thin layers of a curable polymer resin, typically first onto a substrate and then one on top of another. Exposure to actinic radiation cures a thin layer of polymer resin, causing it to harden and adhere to previously cured layers or to the bottom surface of the building platform. Unsaturated compounds (e.g., vinyl-containing compounds, (meth)acrylates, acrylamides) are useful in 3D printing applications because the respective monomers and oligomers are stable at ambient conditions and highly reactive through free radical photopolymerization. Objects formed from unsaturated compounds by 3D printing, however, tend to be brittle because the resulting polymer is generally inhomogeneous and highly cross-linked. The available selection of other conventional raw materials used for 3D printing is generally limited.

Accordingly, there is a need for expanded compositions and methods related to applications of additive manufacturing.

SUMMARY

A multi-component composition for additive manufacturing, and related methods, are generally described. The subject matter of the present invention involves, in some cases, interrelated products, alternative solutions to a particular problem, and/or a plurality of different uses of one or more systems and/or articles.

According to certain embodiments, a composition for additive manufacturing is described, the composition comprising at least one cyanate ester-containing compound, an epoxy-containing compound, and an acrylate- or methacrylate-containing compound, wherein the combined amount of the at least one cyanate ester-containing compound and the epoxy-containing compound is greater than or equal to 30 wt. % and less than or equal to 80 wt. % based on the total weight of the composition.

According to some embodiments, a method of additive manufacturing is described, the method comprising providing a composition comprising at least one cyanate ester-containing compound, an epoxy-containing compound, and an acrylate- or methacrylate-containing compound, wherein the combined amount of the at least one cyanate ester-containing compound and the epoxy-containing compound is greater than or equal to 30 wt. % and less than or equal to 80 wt. % based on the total weight of the composition. In certain embodiments, the method comprises forming a three-dimensional object from the composition by additive manufacturing.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
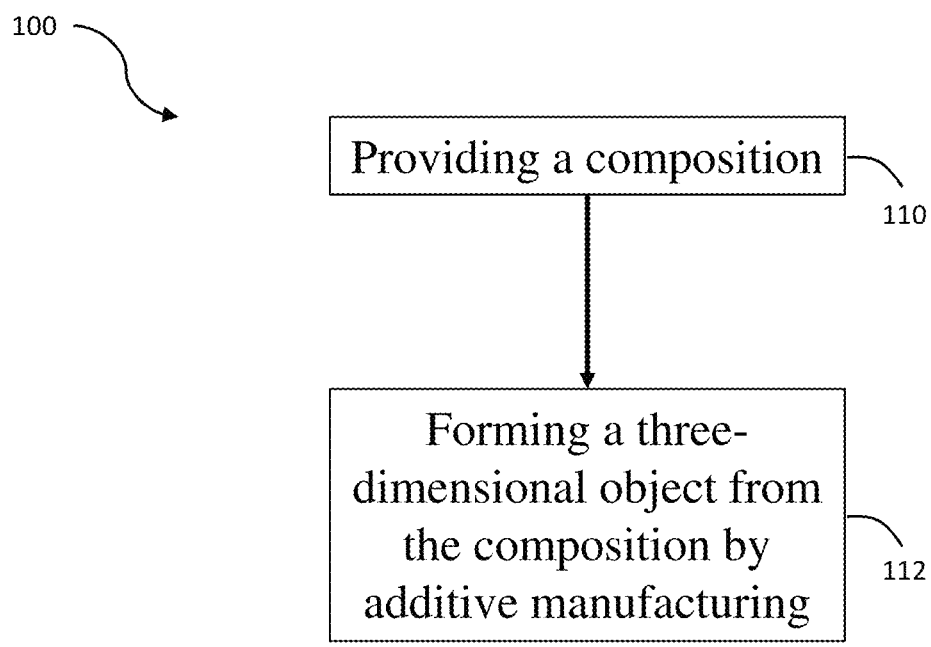
FIG. 1 shows, according to certain embodiments, a scheme depicting a method of additive manufacturing.

A multi-component composition for additive manufacturing, and related methods, are generally described. According to certain embodiments, the composition comprises a multi-component combination of monomers, oligomers, and/or polymers. In some embodiments, for example, the composition comprises a photocurable component (e.g., an acrylate- or methacrylate-containing compound) and a heat curable component. The heat curable component may, in some embodiments, comprise a mixture of a cyanate ester-containing compound and an epoxy-containing compound. As described in further detail below, the composition may comprise a certain combined weight percentage of the cyanate ester-containing compound and the epoxy-containing compound (e.g., between greater than or equal to 30 wt. % and less than or equal to 80 wt. % based on the total weight of the composition) that has been shown to provide a three-dimensional object with desirable mechanical and/or thermal properties. In certain embodiments, for example, the composition may be used to produce (e.g., by additive manufacturing) a three-dimensional object with a relatively high tensile modulus and ultimate tensile strength at increased temperatures.

Furthermore, utilizing a combination of a cyanate ester-containing compound and an epoxy-containing compound advantageously provides a composition with a relatively high tensile strength and heat tolerance at a lower toxicity and/or lower cost as compared to compositions primarily comprising a cyanate ester or an epoxy (or other conventional components suitable for additive manufacturing). For example, compositions primarily comprising a cyanate ester may be highly toxic and/or unduly expensive. In some embodiments, for example, cyanate-ester containing compounds may require proper ventilation during handling, including the use of additional ventilation equipment such as fume hoods, due to their toxicity. It may be possible to avoid such additional equipment or ventilation by using higher molecular weight cyanate-ester containing compounds in smaller quantities. Furthermore, the cost of cyanate ester raw materials is higher as compared to, for example, epoxy resins. Additive manufacturing products produced from compositions primarily comprising an epoxy resin lack the rigidity and/or heat tolerance provided by compositions comprising a cyanate ester. As described herein, however, compositions comprising a certain amount of a mixture of a cyanate ester-containing compound and an epoxy-containing compound may be used to provide products with desirable mechanical and thermal properties at lower toxicity and lower cost. In certain embodiments, the composition may also optionally comprise one or more photoinitiators, catalysts, and/or other specialty additives, as explained in further detail herein.

The composition may be a dual-cure composition. As used herein, the term "dual-cure composition" refers to a composition having at least two separate curing steps that may occur simultaneously or sequentially. For example, in some embodiments, the dual-cure composition may be subjected to a primary curing event that provides a green scaffolding article, followed by a secondary curing event that provides a product (e.g., a three-dimensional object). In some embodiments wherein the composition comprises a photocurable component and second component (e.g., a heat curable component), the photocurable component is subjected to photopolymerization and the second component is subjected to a secondary curing event, such as the application of heat in the presence of a catalyst. Other mechanisms for initializing curing are also possible, as discussed herein in further detail.

Incorporating a dual-cure mechanism may, in some embodiments, make more polymeric chemistries accessible to additive manufacturing, thereby providing improved and diverse mechanical properties that would be difficult or impossible to achieve using a single-cure resin. According to some embodiments, for example, the primary cure creates a green scaffolding article, and once the primary cure constructs the desired object, the secondary cure may provide the object with desired properties, such as increased strength at higher temperatures, which, as explained herein, may be provided by the combination of the cyanate ester-containing compound and the epoxy-containing compound. In some embodiments, a dual-cure mechanism may also advantageously provide a period of time to adjust the shape or placement of the composition while it is in a gel-like form before subjecting the composition to the secondary curing mechanism that completely hardens the composition.

As described herein, the composition may comprise a heat curable component that is configured to cure (e.g., polymerize) upon the initiation of certain conditions. In some embodiments, for example, the conditions may comprise applying a stimulus, such as heat, mechanical force (e.g., sonication), addition of a catalyst, or some other means, to the one or more components. For example, in some embodiments, the heat curable component comprises a combination of a cyanate ester-containing compound and an epoxy-containing compound that is polymerized upon the application of heat and/or in the presence of a catalyst.

The composition may comprise at least one cyanate ester-containing compound. The use of a cyanate ester-containing compound may advantageously provide the composition with desirable mechanical and/or thermal properties, as explained in further detail herein.

In certain embodiments, the composition comprises one cyanate ester-containing compound. In some other embodiments, the composition comprises greater than one cyanate ester-containing compound (e.g., two cyanate ester-containing compounds, three cyanate ester-containing compounds, four cyanate ester-containing compounds, etc.). A mixture of cyanate ester-containing compounds may advantageously provide the composition with various mechanical and/or thermal properties exhibited by each cyanate ester-containing compound.

Any of a variety of cyanate-ester containing compounds may be utilized. In some embodiments, for example, the cyanate ester-containing compound comprises an aromatic cyanate-ester containing compound, a bisphenol cyanate-ester containing compound (e.g., a bisphenol-A cyanate ester-containing compound, a bisphenol-E cyanate ester-containing compound, a bisphenol-F cyanate ester-containing compound, a bisphenol-M cyanate ester-containing compound, and the like), a novolac cyanate ester-containing compound, and/or oligomers thereof. For example, in some embodiments, the cyanate-ester containing compound comprises the structure Ar—O—C≡N or N≡C—O—Ar—O—C≡N, wherein Ar represents benzene, biphenyl, or naphthalene, any of which may be optionally substituted. In some embodiments, the cyanate-ester containing compound comprises the structure Ar—C≡N or N≡C—Ar—C≡N, wherein Ar represents phenol novolac, bisphenol-A, bisphenol-A novolac, bisphenol-E, bisphenol-E novolac, bisphenol-F, bisphenol-F novolac, bisphenol-M, bisphenol-M novolac, and/or phenolphthalein, any of which may be optionally substituted. Other cyanate-ester containing compounds are also possible.

As described herein, the combined amount of the cyanate ester-containing compound and the epoxy-containing compound may be selected to provide a three-dimensional object with desired mechanical and/or thermal properties. Accordingly, the composition may comprise the at least one cyanate ester-containing compound in any of a variety of suitable amounts. In certain embodiments, for example, the composition comprises the at least one cyanate ester-containing compound in an amount greater than or equal to 20 wt. %, greater than or equal to 30 wt. %, greater than or equal to 40 wt. %, or greater, based on the total weight of the composition. In some embodiments, the composition comprises the at least one cyanate ester-containing compound in an amount less than or equal to 50 wt. %, less than or equal to 40 wt. %, less than or equal to 30 wt. %, or less, based on the total weight of the composition. Combinations of the above recited ranges are also possible (e.g., the composition comprises the at least one cyanate ester-containing compound in an amount between greater than or equal to 20 wt. % and less than or equal to 50 wt. % based on the total weight of the composition). Other ranges are also possible.

As described herein, the composition may comprise at least one epoxy-containing compound. The epoxy-containing compound may be configured to form a polyepoxide (e.g., upon curing), in certain embodiments, as would generally be understood by a person of ordinary skill in the art.

The use of an epoxy-containing compound may advantageously lower the overall toxicity and/or cost of the composition, in some embodiments, without sacrificing the desirable mechanical and/or thermal properties provided by the cyanate ester-containing compound.

In certain embodiments, the composition comprises an epoxy-containing compound. In some other embodiments, the composition comprises greater than one epoxy-containing compound (e.g., two epoxy-containing compounds, three epoxy-containing compounds, four epoxy-containing compounds, etc.). A mixture of epoxy-containing compounds may advantageously provide the composition with various mechanical and/or thermal properties exhibited by each epoxy-containing compound.

Any of a variety of epoxy-containing compounds may be utilized. In some embodiments, for example, the epoxy-containing compound comprises a bisphenol epoxy-containing compound (e.g., a bisphenol-A epoxy-containing compound), a novolac epoxy-containing compound, a glycidyl ether epoxy-containing compound, a cycloaliphatic epoxy-containing compound, and/or oligomers thereof. In certain embodiments, the epoxy-containing compound may be an epoxy resin.

In certain non-limiting embodiments, the epoxy-containing compound comprises a bisphenol-A diglycidyl ether, a bisphenol-A epichlorohydrin, and/or a cycloaliphatic epoxide. In some embodiments, the epoxy-containing compound comprises an epoxy component and a bisphenol-A component and/or a bisphenol-A component and an epicholorohydrin component. Other epoxy-containing compounds are also possible.

As described herein, the combined amount of the cyanate ester-containing compound and the epoxy-containing compound may be selected to provide a three-dimensional object with desired mechanical and/or thermal properties. Accordingly, the composition may comprise the epoxy-containing compound in any of a variety of suitable amounts. In certain embodiments, for example, the composition comprises the epoxy-containing compound in an amount greater than or equal to 10 wt. %, greater than or equal to 20 wt. %, greater than or equal to 30 wt. %, greater than or equal to 40 wt. %, or greater, based on the total weight of the composition. In some embodiments, the composition comprises the epoxy-containing compound in an amount less than or equal to 50 wt. %, less than or equal to 40 wt. %, less than or equal to 30 wt. %, less than or equal to 20 wt. %, or less, based on the total weight of the composition. Combinations of the above recited ranges are also possible (e.g., the composition comprises the epoxy-containing compound in an amount between greater than or equal to 10 wt. % and less than or equal to 50 wt. % based on the total weight of the composition, the composition comprises the epoxy-containing compound in an amount between greater than or equal to 20 wt. % and less than or equal to 30 wt. % based on the total weight of the composition). Other ranges are also possible As described herein in greater detail, the use of a cyanate-ester containing compound and an epoxy-containing compound in the described amounts may be used to provide a product with desirable mechanical and/or thermal properties at a lower toxicity and/or lower cost, as compared to compositions substantially comprising a cyanate ester-containing compound or compositions substantially comprising an epoxy-containing compound. Accordingly, the composition may comprise the at least one cyanate-ester containing compound and the epoxy-containing compound in any of a variety of suitable combined amounts. In some embodiments, for example, the composition comprises the at least one cyanate ester-containing compound and the epoxy-containing compound in a combined amount greater than or equal to 30 wt. %, greater than or equal to 40 wt. %, greater than or equal to 50 wt. %, greater than or equal to 60 wt. %, greater than or equal to 70 wt. %, or greater, based on the total weight of the composition. In certain embodiments, the composition comprises the at least one cyanate ester-containing compound and the epoxy-containing compound in a combined amount less than or equal to 80 wt. %, less than or equal to 70 wt. %, less than or equal to 60 wt. %, less than or equal to 50 wt. %, less than or equal to 40 wt. %, or less, based on the total weight of the composition. Combinations of the above recited ranges are also possible (e.g., the composition comprises the at least one cyanate ester-containing compound and the epoxy-containing compound in a combined amount between greater than or equal to 30 wt. % and less than or equal to 80 wt. % based on the total weight of the composition). Other ranges are also possible.

In some embodiments, the composition comprises a catalyst. As would be understood by a person of ordinary skill in the art, the catalyst may be used to catalyze the polymerization of at least a portion of one or more of the heat curable components (e.g., the cyanate ester-containing compound and/or the epoxy-containing compound). For example, the catalyst may be used to accelerate activated carbonyl mechanism chemistry, such as used to provide polyurethanes.

According to certain embodiments, activation of the catalyst may be delayed. In some embodiments, for example, one or more functional groups and/or active groups of the catalyst may be blocked and/or inactivate under a first set of conditions and deblocked and/or activated under a second set of conditions. The second set of conditions may, in certain embodiments, as compared to the first set of conditions, comprise an increase in temperature and/or application of radiation (e.g., photoirradiation), as would generally be understood by a person of ordinary skill in the art.

Any of a variety of suitable catalysts may be utilized. In some embodiments, a suitable catalyst will be a base or a nucleophile that activates carbonyl group transformation as used, for example, in the synthesis of polyurethanes or polyesters. The catalyst may comprise dibutyltin dilaurate (DBTDL), in certain embodiments. Other catalysts may, in some embodiments, comprise a metal (e.g., bismuth, zinc, copper, zirconium, titanium, and/or aluminum). In certain embodiments, the catalyst may be an organic base, an inorganic base, a fluoride base, and/or a phosphine compound. In some embodiments, organic bases include 4-(dimethylamino)pyridine (DMAP), 1,4-diazabicyclo[2.2.2]octane (DABCO), 1,8-diazabicyclo[5.4.0]undec-7-ene (DBU), 1,5-diazabicyclo[4.3.0]non-5-ene (DBN), 1,5,7-triazabicyclo[4.4.0]dec-5-ene (TBD), and the like. Inorganic bases include, in certain embodiments, NaOH and/or KOH. According to some embodiments, fluoride bases include CsF. In some embodiments, phosphine compounds include triphenyl phosphine and/or dimethyl phenyl phosphine.

The composition may comprise the catalyst in any of a variety of suitable amounts. In certain embodiments, for example, the composition comprises the catalyst in an amount greater than or equal to 0.1 wt. %, greater than or equal to 0.5 wt. %, greater than or equal to 1 wt. %, or greater, based on the total weight of the composition. In some embodiments, the composition comprises the catalyst in an amount less than or equal to 2 wt. %, less than or equal to 1 wt. %, less than or equal to 0.5 wt. %, or less, based on the total weight of the composition. Combinations of the above recited ranges are also possible (e.g., the composition comprises the catalyst in an amount between greater than or equal to 0.1 wt. % and less than or equal to 2 wt. % based on the total weight of the composition). Other ranges are also possible.

As described herein, the composition may comprise a photocurable component. For example, in some embodiments, the composition comprises an acrylate- or methacrylate-containing compound. In certain embodiments, the composition comprises greater than one acrylate- or methacrylate-containing compound (e.g., two acrylate- or methacrylate-containing compounds, three acrylate- or methacrylate-containing compounds, four acrylate- or methacrylate-containing compounds, etc.). Utilizing acrylate- or methacrylate-containing compounds for additive manufacturing is advantageous, in some embodiments, because monomers, oligomers, and/or polymers of the acrylate- or methacrylate-containing compounds are generally stable and highly reactive under ambient conditions. As would be understood by a person of ordinary skill in the art, the acrylate- or methacrylate-containing compound is a photocurable component configured to cure when subjected to an effective amount of actinic radiation, as described in further detail herein.

In certain non-limiting embodiments, the acrylate- or methacrylate-containing compound comprises ethyl acrylate; 2-hydroxyethyl methacrylate; phenoxyethyl (meth) acrylate; 2-hydroxyethyl (meth)acrylate; octadecyl acrylate; cyclic trimethylolpropane formal acrylate; 2-[[(butylamino) carbonyl]oxy]ethyl acrylate; lauryl acrylate; bisphenol A-glycidyl methacrylate; 2(2-ethoxyethoxy) ethyl acrylate; isobornyl (meth)acrylate; caprolactone acrylate; 1,6 hexanediol di(meth)acrylate; tricyclodecane dimethanol di(meth) acrylate; tripropylene glycol diacrylate; urethane dimethacrylate (UDMA); ethoxylated trimethylolpropane triacrylate; trimethylolpropane triacrylate; tris (2-hydroxy ethyl) isocyanurate triacrylate; pentaerythritol tetraacrylate; dipentaerythritol pentaacrylate; and/or dendritic acrylates (e.g., with average functionalities between 10-50). Other acrylate- or methacrylate-containing compounds are also possible.

The composition may comprise the acrylate- or methacrylate-containing compound in any of a variety of suitable amounts. In certain embodiments, for example, the composition comprises the acrylate- or methacrylate-containing compound in an amount greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, or greater, based on the total weight of the composition. In some embodiments, the composition comprises the acrylate- or methacrylate-containing compound in an amount less than or equal to 70 wt. %, less than or equal to 60 wt. %, less than or equal to 50 wt. %, less than or equal to 40 wt. %, less than or equal to 30 wt. %, less than or equal to 20 wt. %, or less, based on the total weight of the composition. Combinations of the above recited ranges are also possible (e.g., the composition comprises the acrylate- or methacrylate-containing compound in an amount between greater than or equal to 10 wt. % and less than or equal to 70 wt. % based on the total weight of the composition, the composition comprises the acrylate- or methacrylate-containing compound in an amount between greater than or equal to 20 wt. % and less than or equal to 40 wt. % based on the total weight of the composition). Other ranges are also possible.

The composition may comprise one or more vinyl-containing compounds (e.g., a compound with the functional group —CH=CH$_2$). Examples of vinyl-containing compounds include N-vinyl caprolactam, N-vinyl pyrrolidone, acrylamides (e.g., N,N-dimethyl acrylamide, diacetone acrylamide, N-isopropylacrylamide, N-hydroxyethyl acrylamide), vinyl ethers (e.g., 4-hydroxybutyl vinyl ether, cyclohexanedimethanol divinyl ether, triethyleneglycol divinyl ether), and/or mixtures thereof.

In some embodiments, the composition comprises the one or more-vinyl-containing compounds in any of the amounts described herein with respect to the acrylate- or methacrylate-containing compound.

As noted above, the composition may comprise a photoinitiator. The use of a photoinitiator, along with a relevant light source, may be used to cure the acrylate-, methacrylate-, and/or vinyl-containing compound. For example, in certain embodiments, the photoinitiator and relevant light source may polymerize the acrylate- or methacrylate-containing compound by photopolymerization. In some embodiments, the material formed by exposing the acrylate- or methacrylate-, and/or vinyl-containing compound to the photoinitiator and relevant light source may be a green article, indicative of the fact that further curing and/or strengthening of the composition may occur.

Any of a variety of suitable photoinitiators may be utilized. The photoinitiator may, in certain embodiments, comprise a free radical initiator, as would generally be understood by a person of ordinary skill in the art. The photoinitiator may comprise a phosphine oxide or an alpha-hydroxy ketone. In some embodiments, for example, the photoinitiator comprises a bisacylphosphine oxide (BAPO) (e.g., phenylbis(2,4,6-trimethylbenzoyl)phosphine oxide) and/or diphenyl(2,4,6-trimethylbenzoyl)phosphine oxide (TPO).

The composition may comprise the photoinitiator in any of a variety of suitable amounts. In certain embodiments, for example, the composition comprises the photoinitiator in an amount greater than or equal to 0.1 wt. %, greater than or equal to 1 wt. %, greater than or equal to 2 wt. %, or greater, based on the total weight of the composition. In some embodiments, the composition comprises the photoinitiator in an amount less than or equal to 5 wt. %, less than or equal to 2 wt. %, less than or equal to 1 wt. %, or less, based on the total weight of the composition. Combinations of the above recited ranges are also possible (e.g., the composition comprises the photoinitiator in an amount between greater than or equal to 0.1 wt. % and less than or equal to 5 wt. % based on the total weight of the composition). Other ranges are also possible.

In certain embodiments, the composition comprises one or more additives. For example, in some embodiments, the resin may comprise one or more pigments and/or dyes, fumed silica, rubber toughening agents, clays, fibers, oligomeric thermoplastics, and/or core shell particles. One or more stabilizers, antioxidants, and/or flame retardants may also be used, in some embodiments, which may advantageously provide the composition with high temperature performance and/or increased shelf life. Other additives may also be used.

A method of additive manufacturing is described, according to some embodiments. For example, FIG. 1 shows, according to certain embodiments, a scheme depicting a method of additive manufacturing. Additive fabrication techniques may include, in certain embodiments, stereolithography, selective or fused deposition modeling, photopolymer extrusion, direct composite manufacturing, laminated object manufacturing, selective phase area deposition, multi-phase jet solidification, ballistic particle manufacturing, particle deposition, laser sintering, and/or combinations thereof.

Referring to FIG. 1, in some embodiments, method 100 comprises step 110 comprising providing a composition as described herein. In certain embodiments, method 100 comprises step 112 comprising forming a three-dimensional object from the composition by additive manufacturing.

In certain embodiments, forming the three-dimensional object comprises curing the composition at a first temperature (e.g., between greater than or equal to 50° C. and less than or equal to 300° C.) for a first duration (e.g., between greater than or equal to 0.1 hours and less than or equal to 5 hours). In certain embodiments, the three-dimensional object may be cured in a mold. In some embodiments, curing the composition at the first temperature for the first duration may comprise subjecting the composition to actinic radiation to photo-cure (e.g., polymerize) the acrylate-, methacrylate-, or vinyl-containing compound. The first curing step may provide a green scaffolding article, as described herein in further detail.

In some embodiments, after curing the composition at the first temperature for the first duration, the three-dimensional object is cooled. In certain embodiments, after cooling the three-dimensional object, the three-dimensional object is removed from a mold. According to some embodiments, after the composition is cooled (and/or removed from the mold), the composition is further cured at a second temperature (e.g., between greater than or equal to 50° C. and less than or equal to 300° C.) for a second duration (e.g., between greater than or equal to 0.1 hours and less than or equal to 5 hours).

In certain embodiments, the composition is cooled after curing the composition at the second temperature for the second duration.

As described herein, a three-dimensional object produced from the composition (e.g., by additive manufacturing) may advantageously have desirable mechanical and/or thermal properties, for example, a relatively high a tensile modulus, tensile elongation, ultimate tensile strength, heat deflection temperature, and/or glass transition temperature.

The three-dimensional object may have any of a variety of suitable tensile moduli. In some embodiments, for example, the three-dimensional object has a tensile modulus between greater than or equal to 2000 MPa and less than or equal to 5000 MPa. Other ranges are also possible. The tensile modulus may be determined by dynamic mechanical analysis (DMA) or calculated by methods known to those of ordinary skill in the art, for example, using the standard test method for tensile strength of plastics (ASTM D 638).

The three-dimensional object may have any of a variety of suitable tensile elongation percentages. In some embodiments, for example, the three-dimensional object has a tensile elongation percentage between greater than or equal to 1% and less than or equal to 10%. Other ranges are also possible. The tensile elongation percentage may be determined by DMA or calculated by methods known to those of ordinary skill in the art, for example, using ASTM D 638.

The three-dimensional object may have any of a variety of suitable ultimate tensile strengths. In certain embodiments, for example, the three-dimensional object has an ultimate tensile strength between greater than or equal to 70 MPa and less than or equal to 110 MPa. Other ranges are also possible. The ultimate tensile strength may be determined by DMA or calculated by methods known to those of ordinary skill in the art, for example, using ASTM D 638.

The three-dimensional object may have any of a variety of suitable heat deflection temperatures. In some embodiments, for example, the three-dimensional object has a heat deflection temperature between greater than or equal to 150° C. and less than or equal to 300° C. Other ranges are also possible. The heat deflection temperature may be determined by DMA or calculated by methods known to those or ordinary skill in the art, for example, using the standard test method for deflection temperature of plastics (ASTM D 648).

The three-dimensional object may have any of a variety of suitable glass transition temperatures ($T_g$). In certain embodiments, for example, the three-dimensional object has a $T_g$ temperature between greater than or equal to 150° C. and less than or equal to 300° C. Other ranges are also possible. The glass transition temperature may be determined by measuring the tan delta peak using, for example, DMA or calculated by methods known to those of ordinary skill in the art, for example, using the standard practice for plastics: dynamic mechanical properties (ASTM D 4065).

EXAMPLE

The following examples describes multi-component compositions for additive manufacturing.

The acrylate-containing compound used to three-dimensionally print the green scaffolding material was first individually evaluated. Screening of acrylate monomers was performed to identify the best monomer that produces a printable green modulus at the lowest loading(s). Each prospective monomer was diluted with 20% isobornyl methacrylate to reduce viscosity. A visible light photoinitiator used was at 1 wt. % loading. Squares were printed and results are summarized in Table 1.

TABLE 1

| Screening of multifunctional acrylates | | | |
|---|---|---|---|
| Monomer | Critical Energy (Ec) (mJ/cm$^2$) | Depth of Penetration (Dp) (micrometers) | Thickness of square (mm) |
| UDMA | 47 | 1162 | 1.43 |
| Dendritic acrylate with average functionality of 15 | 63 | 1229 | 1.68 |
| Ethyl acrylate monomer | 42 | 1274 | 1.99 |
| Dendritic acrylate with average functionality of 30 | 50 | 1164 | 1.66 |
| Dipentaerythritol pentaacrylate | 52 | 1254 | 1.74 |
| Ethyl acrylate monomer/ UDMA (50/50) | 41 | 1188 | 1.9 |

The ethyl acrylate monomer was chosen as the acrylate compound, and the minimal loading required for printing with a non-reactive component was next evaluated. The non-reactive component was bisphenol-A diglycidyl ether, a bisphenol-A epoxy-containing compound pourable at room temperature. The formulations for 3D-printing each incorporated 2 wt. % propylene carbonate to decrease viscosity. Squares were printed and results are shown in Table 2.

TABLE 2

Screening of ethyl acrylate monomer at different loadings.

| Formulation | Critical Energy (Ec) (mJ/cm$^2$) | Depth of Penetration (Dp) (micrometers) | Thickness of square (mm) |
|---|---|---|---|
| 80 wt. % Bisphenol-A diglycidyl ether, 20 wt. % ethyl acrylate monomer, 1 wt. % TPO | 47 | 1031 | 1.47 |
| 90 wt. % bisphenol-A diglycidyl ether, 10 wt. % ethyl acrylate monomer, 1 wt. % TPO | 63 | 8098 | 0.96 |
| 92.5 wt. % bisphenol-A diglycidyl ether, 7.5 wt. % ethyl acrylate monomer, 1 wt. % TPO | 80 | 852 | 0.89 |
| 90 wt. % bisphenol-A diglycidyl ether, 10 wt. % ethyl acrylate monomer, 2 wt. % TPO | 41 | 485 | 0.81 |
| 90 wt. % bisphenol-A diglycidyl ether, 10 wt. % ethyl acrylate monomer, 3 wt. % TPO | 27 | 342 | 0.69 |
| 90 wt. % bisphenol-A diglycidyl ether, 10 wt. % Ethyl acrylate monomer, 1 wt. % BAPO | 16 | 173 | 0.44 |
| 90 wt. % bisphenol-A diglycidyl ether, 10 wt. % ethyl acrylate monomer, 2 wt. % BAPO | 8 | 108 | 0.35 |

It was found that 15 wt. % of ethyl acrylate monomer combined with 85% bisphenol-A diglycidyl ether as non-reactive liquid could print squares with BAPO as photoinitiator. A more robust printability was also found with 20 wt. % of ethyl acrylate monomer combined with 80 wt. % bisphenol-A diglycidyl ether and 2 wt. % TPO.

Next, a pure cyanate ester formulation was evaluated. The cyanate ester resin, denoted "CE-1", contained 60 wt. % bisphenol-E cyanate ester and 40 wt. % cyanate ester novolac. This ratio (e.g., 60:40 bisphenol-E cyanate ester/cyanate ester novolac) has pourable viscosity at room temperature. The catalyst used was dibutyltin dilaurate (DBTDL), added as one drop from a small plastic pipette. The resin in a silicone mold was heated to and cured at 130° C. for 3 hours. The samples in the molds were then cooled to room temperature in the oven overnight. The samples were then removed from the molds and heated to and post cured at 180° C. for 30 minutes. Samples were again cooled to room temperature in the oven overnight.

An acrylate-cyanate ester hybrid formulation (denoted "ACE-1") was also evaluated. The formulation contained 78 wt. % CE-1, 20 wt. % ethyl acrylate monomer, and 2 wt. % TPO. One drop of DBTDL was also added as catalyst. The liquid composition in a silicone mold was cured with ultraviolet (UV) radiation for 30 minutes. The semi-cured composition in the mold was then cured using the same process as used for the pure cyanate ester resin, i.e., 130° C. for 3 hours to harden, cool to room temperature, remove from the mold, then 180° C. for 30 minutes to post cure, then cool to room temperature.

An epoxy-cyanate ester hybrid formulation was also evaluated. Cyanate ester resins range from $200/kg to over $500/kg. The high cost of the raw materials can be decreased by incorporating an epoxy-containing compound, which is generally less than $10/kg. The epoxy will co-react with the cyanate ester. For an initial example, a composition (denoted "ECE-1") was formulated with 40 wt. % bisphenol-A diglycidyl ether, 40 wt. % bisphenol-E cyanate ester, and 20 wt. % cyanate ester novolac. This formulation has pourable viscosity at room temperature. Testing samples were prepared in the pure cyanate ester resin and the acrylate-cyanate ester hybrid formulations.

Figure 2:
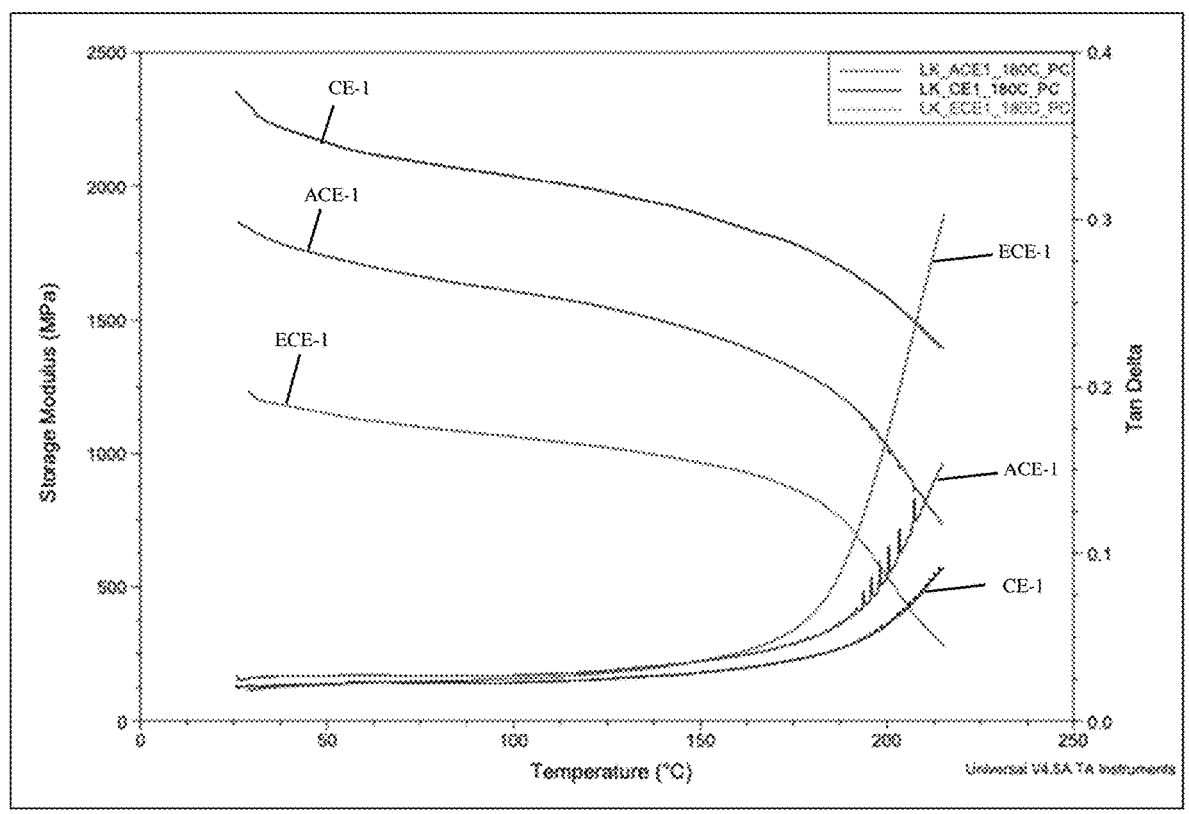
FIG. 2 shows, according to certain embodiments, storage modulus and tan delta as a function of temperature for CE-1, ECE-1, and ACE-1 formulations.

The results of CE-1, ECE-1, and ACE-1 are shown in Table 3. Each formulation showed desirable tensile modulus, ultimate tensile strength (UTS), glass transition temperature ($T_g$), and heat deflection temperature (HDT). As shown in FIG. 2, the storage modulus for each resin was maintained up to about 150° C., indicating the potential for applications requiring high sustained service temperatures, for example automotive applications.

Figure 3:
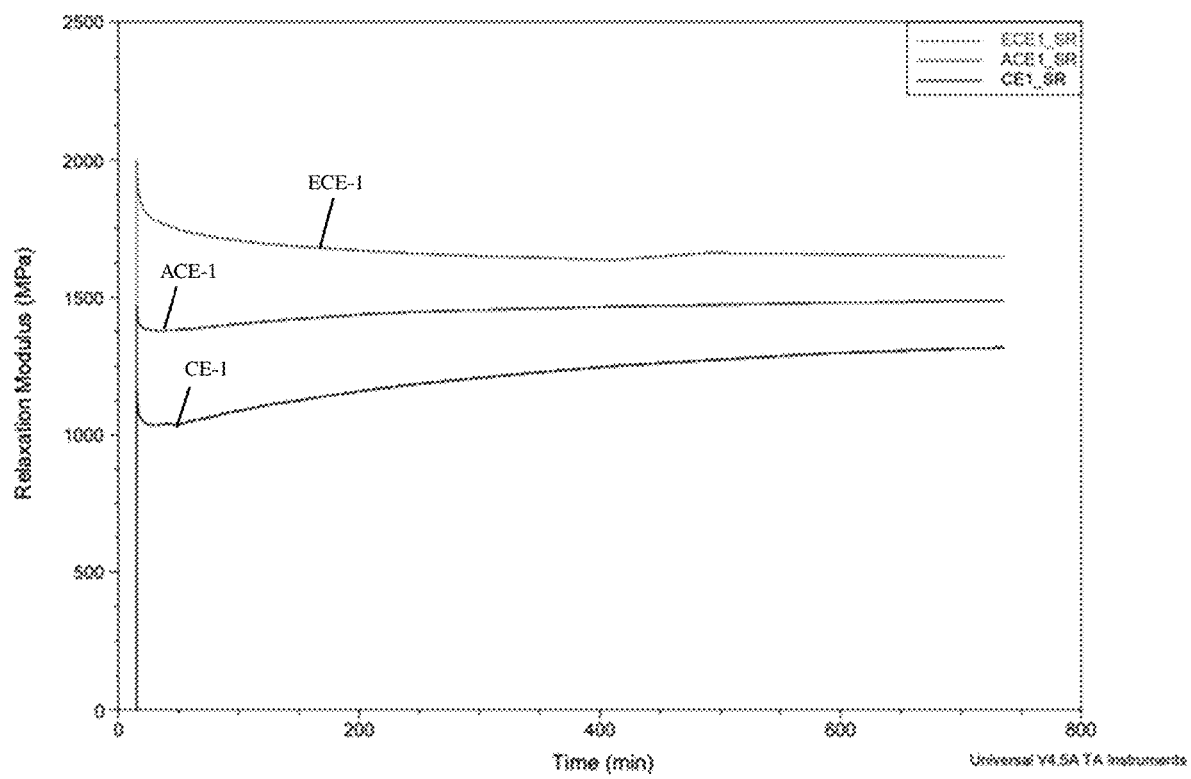
FIG. 3 shows, according to certain embodiments, relaxation modulus as a function of time for CE-1, ECE-1, and ACE-1 formulations.

Stress retention, which is indicative of creep, was also excellent. This is a key differentiator for using cyanate ester resins as compared to methacrylates or cationic epoxies. The stress retention curves shown in FIG. 3 displayed nearly complete stress retention over 12 hours.

TABLE 3

Components and properties CE-1, ECE-1, and ACE-1 formulations.

| Formulation: | CE-1 | ECE-1 | ACE-1 |
|---|---|---|---|
| Bisphenol-E cyanate ester(wt. %) | 60 | 40 | 47 |
| Cyanate ester novolac (wt. %) | 40 | 20 | 31 |
| Bisphenol-A diglycidyl ether (wt. %) | | 40 | |
| Ethyl acrylate monomer (wt. %) | | | 20 |
| Visible light photoinitiator (wt. %) | | | 1 |
| DBTDL | 1 drop | 1 drop | 1 drop |
| Properties: | | | |
| Tensile modulus (MPa) | 3478 | 3069 | 3846 |
| Tensile elongation (%) | 2.1 | 3.9 | 2.5 |
| Ultimate tensile strength (MPa) | 75 | 96 | 80 |
| Tan delta peak (° C.) | >220 | >220 | >220 |
| Estimated HDT (° C.) | >220 | >220 | >220 |
| 12 hr stress retention (%) | >90% | >90% | >90% |

Based on the performance of the epoxy-cyanate ester formulation (ECE-1), acrylate hybrids of the epoxy-cyanate ester formulation were also evaluated (denoted as "A-ECE"). Results are shown in Table 4.

| Formulation: | A-ECE-1 | A-ECE-2 | A-ECE-3 | A-ECE-4 |
|---|---|---|---|---|
| Bisphenol-E cyanate ester (wt. %) | 31 | 27 | 23 | 19 |
| Cyanate ester novolac (wt. %) | 16 | 14 | 12 | 10 |

-continued

| Formulation: | A-ECE-1 | A-ECE-2 | A-ECE-3 | A-ECE-4 |
|---|---|---|---|---|
| Bisphenol-A diglycidyl ether (wt. %) | 32 | 28 | 24 | 20 |
| Combined amount of cyanate ester-containing compound and epoxy-containing compound (wt. %) | 79 | 69 | 59 | 49 |
| Ethyl acrylate monomer (wt. %) | 20 | 30 | 40 | 50 |
| Visible light photoinitiator (wt. %) | 1 | 1 | 1 | 1 |
| DBTDL | 1 drop | 1 drop | 1 drop | 1 drop |
| Properties: | | | | |
| Tensile modulus (MPa) | 3230 | 3556 | 3735 | 3915 |
| Tensile elongation (%) | 4.9 | 3.7 | 2.4 | 3.4 |
| Ultimate tensile strength (MPa) | 93 | 92 | 84 | 93 |
| Tan delta peak (° C.) | 210 | 210 | 190 | ~180 |
| Estimated HDT (° C.) | 200 | >200 | >200 | 180 |
| 12 hour stress retention (%) | >90% | >90% | >90% | >90% |

Figure 4:
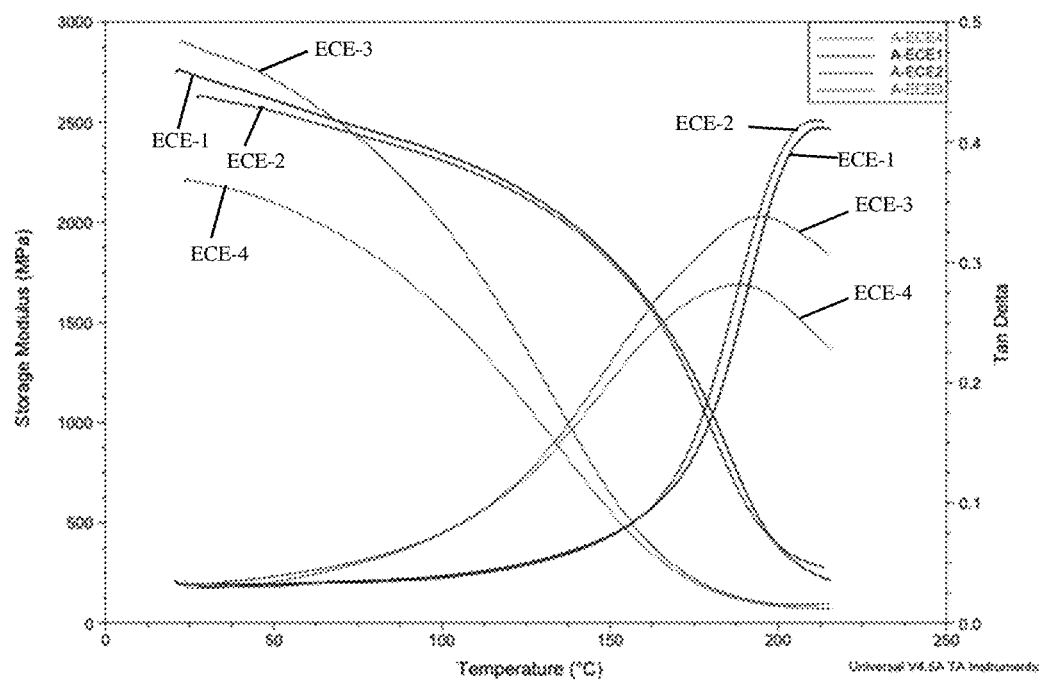
FIG. 4 shows, according to certain embodiments, storage modulus and tan delta as a function of temperature for A-ECE-(1-4) formulations.

Formulations containing 20 wt. % and 30 wt. % acrylate showed comparable $T_g$ and modulus behavior via dynamic mechanical analysis (DMA), as shown in FIG. 4. These formulations maintained their modulus to 150° C. or greater, suggesting potential use for high temperature applications. Formulations containing 40 wt. % and 50 wt. % acrylate, and therefore a lower combined amount of the cyanate ester-containing compound and the epoxy-containing compound, showed lower $T_g$ and modulus softening at lower temperatures. These results indicate that at an amount of around 40 wt. % acrylate and 60 wt. % cyanate ester-epoxy mixture is where the high temperature resistance benefit of the cyanate ester-epoxy begins to decline.

Regarding tensile properties, the best performance was with the lowest wt. % of acrylate, i.e., 20 wt. %. This formulation, A-ECE-1, has elongation and ultimate tensile strength comparable to the ECE-1 formulation.

Figure 5:
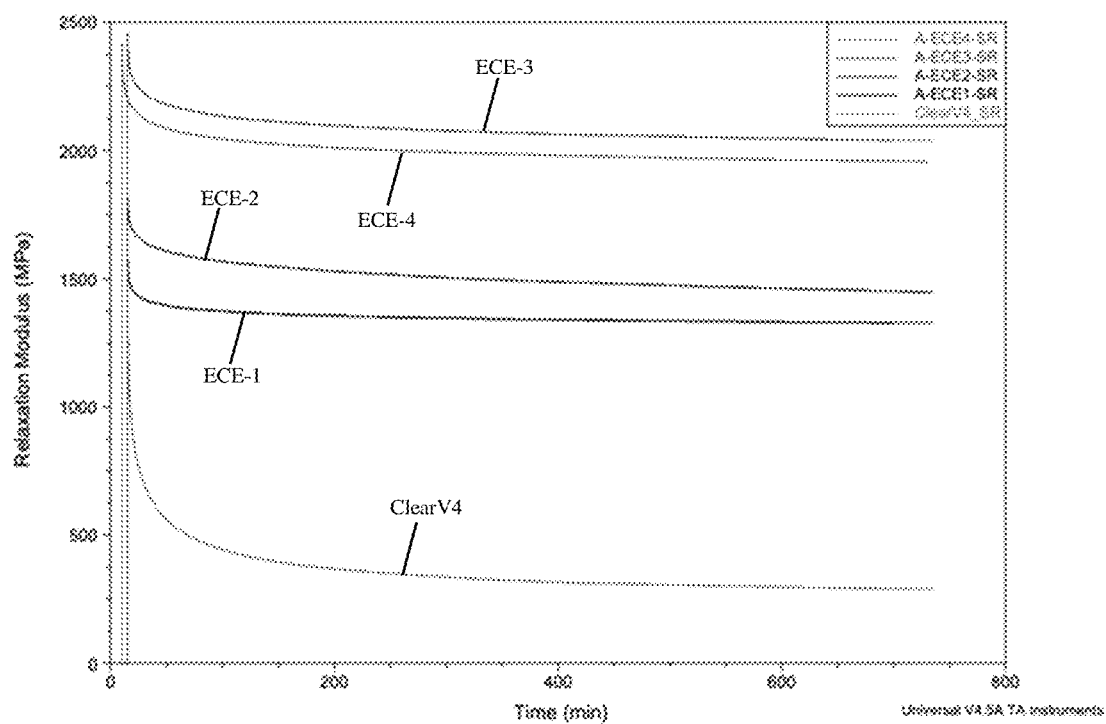
FIG. 5 shows, according to certain embodiments, relaxation modulus as a function of time for A-ECE-(1-4) formulations.

As shown in FIG. 5, stress retention was desirable for all four formulations, indicating that as little as 50 wt. % of the cyanate ester-epoxy mixture is required for low creep.

Figure 6:
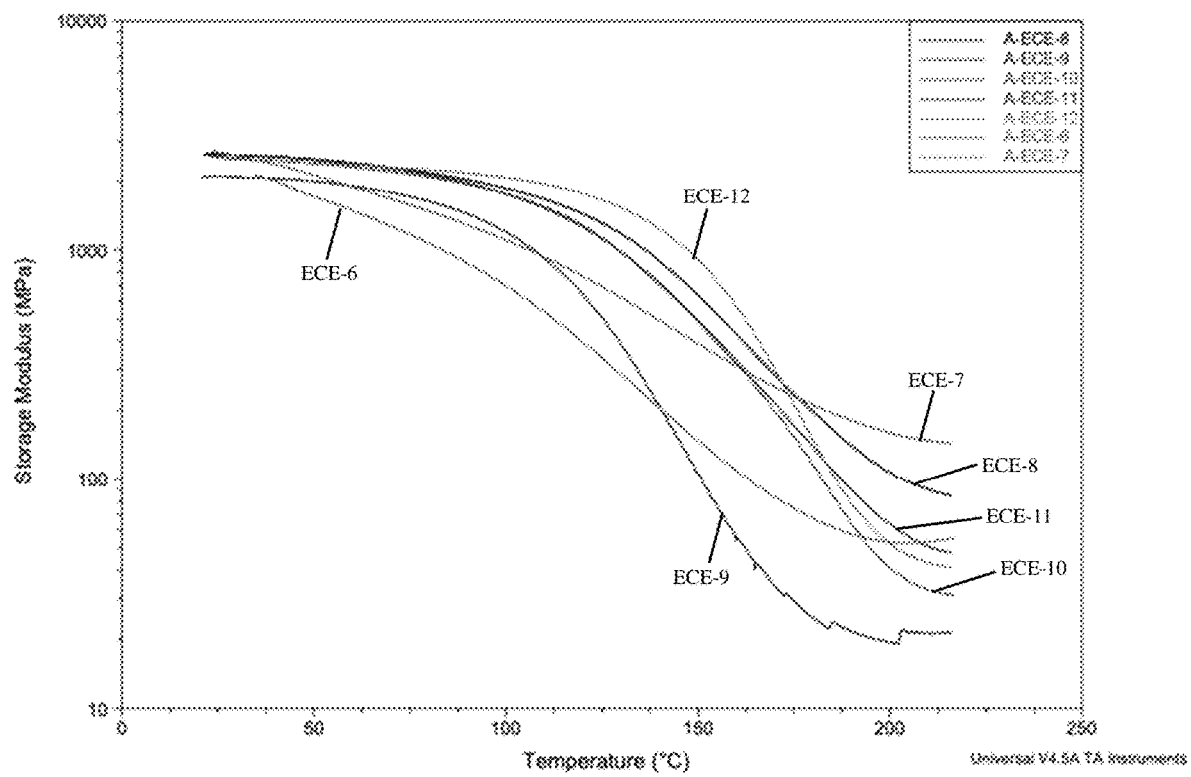
FIG. 6 shows, according to certain embodiments, storage modulus as a function of temperature for A-ECE-(6-12) formulations.
Figure 7:
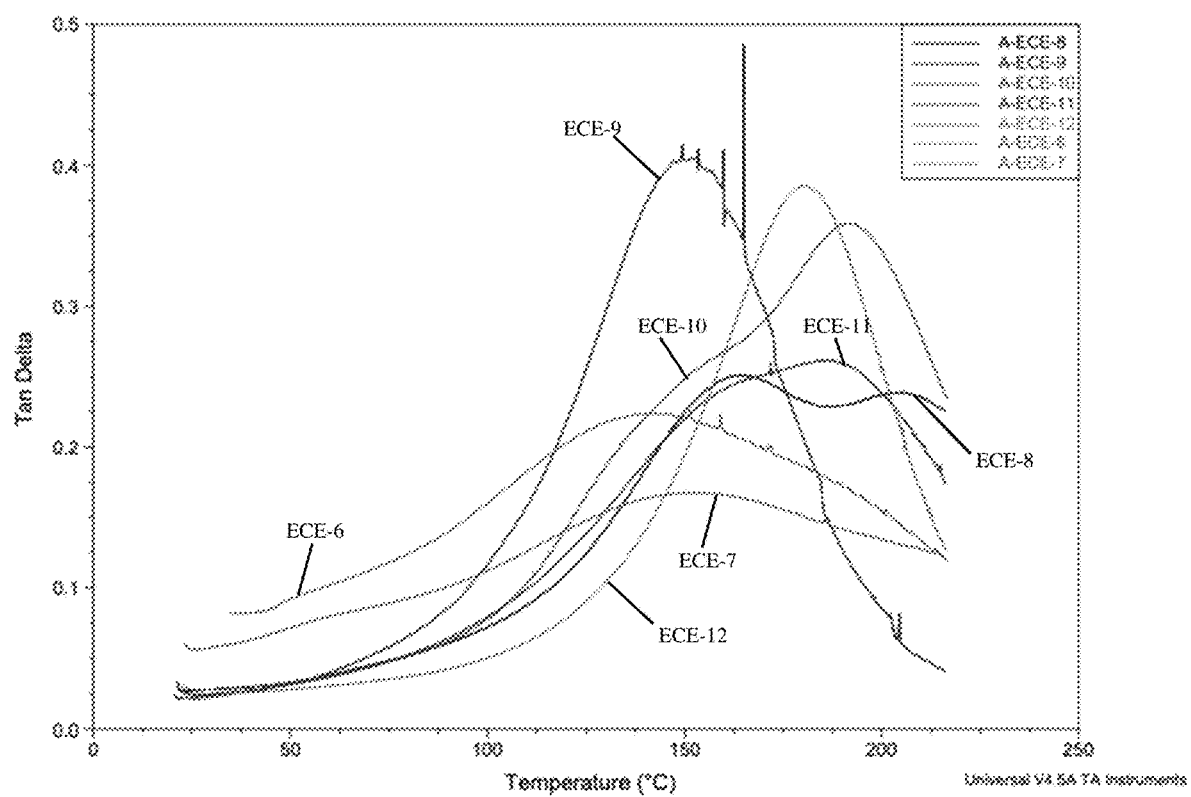
FIG. 7 shows, according to certain embodiments, tan delta as a function of temperature for A-ECE-(6-12) formulations.

Bisphenol-E cyanate ester has a toxic profile that may be unable to be commercialized for conventional 3D printer users. This material is also extremely expensive, more than double that of the cyanate ester novolac. Alternative formulations without bisphenol-E cyanate ester were therefore screened. Results are shown in Tables 5 and 6. Two approaches were taken to compensate for the loss of bisphenol-E cyanate ester's diluency power: (i) changing the amount of epoxy (see, e.g., formulations 6 and 7); and (ii) changing the amount of acrylate (see, e.g., formulations 8 through 12). By removing bisphenol-E cyanate ester from the formulation, the raw material cost goes down significantly. Furthermore, the hazard is also reduced to where these formulations can be printed without special ventilation precautions. Formulations 11 and 12 show low toxicity, low cost, and high UTS. FIGS. 6 and 7 show the storage modulus and tan delta temperature, respectively.

Formulation 12 was also formulated with the alternative catalyst zinc carboxylate. Tensile properties were slightly lower, but the $T_g$ and temperature resistance were markedly reduced. Onset of softening occurred at a lower temperature for Formulation 12 with zinc carboxylate vs. Formulation 12 with DTBDL.

TABLE 5

Components of acrylate-epoxy-cyanate ester (A-ECE) hybrid formulations without bisphenol-E cyanate ester.

| | Formulation | | | | | | | |
|---|---|---|---|---|---|---|---|---|
| | A-ECE-6 | A-ECE-7 | A-ECE-8 | A-ECE-9 | A-ECE-10 | A-ECE-11 | A-ECE-12 | A-ECE-12 |
| Cynate ester novolac (wt. %) | 30 | 40 | 30 | 20 | 25 | 25 | 25 | 25 |
| Cycloaliphatic epoxy (wt. %) | 19 | 22 | | | | | | |
| Bisphenol-A diglycidyl ether (wt. %) | 20 | 7 | 39 | 49 | 44 | 44 | 44 | 44 |
| Combined amount of cyanate ester-containing compound and epoxy-containing compound (wt. %) | 69 | 69 | 69 | 69 | 69 | 69 | 69 | 69 |
| Ethyl acrylate monomer (wt. %) | 30 | 30 | 10 | 20 | | 10 | 20 | 20 |

TABLE 5-continued

Components of acrylate-epoxy-cyanate ester (A-ECE) hybrid formulations without bisphenol-E cyanate ester.

| | Formulation | | | | | | | |
|---|---|---|---|---|---|---|---|---|
| | A-ECE-6 | A-ECE-7 | A-ECE-8 | A-ECE-9 | A-ECE-10 | A-ECE-11 | A-ECE-12 | A-ECE-12 |
| Isobornyl methacrylate (wt. %) | | | 20 | 10 | 20 | | | |
| Cyclic aliphatic diacrylate (wt. %) | | | | | | 20 | | |
| UDMA (wt. %) | | | | 10 | | | | |
| HPMA (wt. %) | | | | | | | 10 | 10 |
| Visible light photoinitiator (wt. %) | 1 | 1 | 1 | 1 | 1 | 1 | 1 | 1 |
| DBTDL | 1 drop | 1 drop | 1 drop | 1 drop | 1 drop | 1 drop | 1 drop | |
| Zinc carboxylate | | | | | | | | 1 drop |

TABLE 6

Properties of acrylate-epoxy-cyanate ester (A-ECE) hybrid formulations without bisphenol-E cyanate ester.

| | Properties: | | | | | | | |
|---|---|---|---|---|---|---|---|---|
| | A-ECE-6 | A-ECE-7 | A-ECE-8 | A-ECE-9 | A-ECE-10 | A-ECE-11 | A-ECE-12 | A-ECE-12 |
| Tensile modulus (MPa) | 2440 | 2932 | 3630 | 3859 | 3549 | 3714 | 3405 | 3998 |
| Tensile elongation (%) | 1.4 | 2.8 | 1.8 | 1.6 | 1.3 | 3.4 | 3.4 | 3.1 |
| Tensile stress max (MPa) | 34 | 61 | 59 | 72 | 44 | 96 | 93 | 90 |
| Tan delta peak (° C.) | 140 | 150 | 170 | 160 | | 175 | 185 | 155 |
| Estimated HDT (° C.) | 150 | 150 | >200 | 180 | | >200 | >200 | 200 |
| 12 hour stress retention | 70% | 75% | >90% | 80% | | 85% | >90% | 80% |

Bisphenol-M cyanate ester was used as an alternative to cyanate ester novolac. Results are shown in Table 7.

TABLE 7

Components and properties of acrylate-epoxy-cyanate ester (A-ECE) hybrid formulations with bisphenol-M cyanate ester.

| Formulation | A-ECE-12 | A-ECE-13 |
|---|---|---|
| Cyanate ester novolac (wt. %) | 25 | |
| Bisphenol-M cyanate ester (wt. %) | | 25 |
| Bisphenol-A diglycidyl ether (wt. %) | 44 | 44 |
| Combined amount of cyanate ester-containing compound and epoxy-containing compound (wt. %) | 69 | 69 |
| Ethyl acrylate monomer (wt.) | 20 | 20 |
| HMPA (wt. %) | 10 | 10 |
| Visible light photoinitiator (wt. %) | 1 | 1 |
| DBTDL | 1 drop | 1 drop |
| Properties: | | |
| Tensile modulus (MPa) | 3405 | ~3000 |
| Tensile elongation (%) | 3.4 | <1% |
| Tensile stress max (MPa) | 93 | 30 |
| Tan delta peak (C) | 185 | 100 + (broad) |
| Estimated HDT (C) | >200 | <100 |
| Stress retention, 12 hrs | >90% | |

In conclusion, compositions comprising a combined amount of an epoxy-containing compound and a cyanate ester-containing compound between 30 wt. % and 80 wt. % (e.g., between 50 wt. % and 80 wt. %) based on the total weight of the composition may be used to provide three-dimensional articles with desirable mechanical and/or thermal properties, including tensile moduli, tensile elongations, ultimate tensile strengths, glass transition temperatures, and heat deflection temperatures.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A multi-component composition for additive manufacturing, the composition comprising:
    at least one cyanate ester-containing compound;
    an epoxy-containing compound, wherein the epoxy-containing compound comprises a bisphenol epoxy-containing compound, a novolac epoxy-containing compound, a glycidyl ether epoxy-containing compound, a cycloaliphatic epoxy-containing compound, and/or mixtures thereof; and
    an acrylate- or methacrylate-containing compound,
    wherein a combined amount of the at least one cyanate ester-containing compound and the epoxy-containing compound is greater than 60 wt. % and less than or equal to 80 wt. % based on a total weight of the composition.

2. The composition of claim 1, comprising the at least one cyanate ester-containing compound in an amount between greater than or equal to 20 wt. % and less than or equal to 50 wt. % based on the total weight of the composition.

3. The composition of claim 1, comprising the epoxy-containing compound in an amount between greater than or equal to 10 wt. % and less than or equal to 50 wt. % based on the total weight of the composition.

4. The composition of claim 1, comprising the acrylate- or methacrylate-containing compound in an amount between greater than or equal to 10 wt. % and less than or equal to 70 wt. % based on the total weight of the composition.

5. The composition of claim 1, further comprising a photoinitiator.

6. The composition of claim 5, wherein the photoinitiator comprises diphenyl(2,4,6-trimethylbenzoyl)phosphine oxide (TPO) and/or phenylbisphosphine oxide (BAPO).

7. The composition of claim 5, comprising the photoinitiator in an amount between greater than or equal to 0.1 wt. % and less than or equal to 2 wt. % based on the total weight of the composition.

8. The composition of claim 1, further comprising a catalyst.

9. The composition of claim 8, comprising the catalyst in an amount less than or equal to 1 wt. % based on the total weight of the composition.

10. The composition of claim 1, wherein the at least one cyanate ester-containing compound comprises a bisphenol-A cyanate ester-containing compound, a bisphenol-E cyanate ester-containing component, a bisphenol-F cyanate ester-containing component, a bisphenol-M cyanate ester-containing compound, a novolac cyanate ester-containing compound, and/or mixtures thereof.

11. The composition of claim 1, wherein the acrylate- or methacrylate-containing compound comprises ethyl acrylate; 2-hydroxyethyl methacrylate; phenoxyethyl (meth)acrylate; 2-hydroxyethyl (meth)acrylate; octadecyl acrylate; cyclic trimethylolpropane formal acrylate; 2[[(butylamino) carbonyl]oxy]ethyl acrylate; lauryl acrylate; bisphenol A-glycidyl methacrylate; 2(2-ethoxyethoxy) ethyl acrylate; isobornyl (meth)acrylate ; caprolactone acrylate; 1,6 hexanediol di(meth)acrylate; tricyclodecane dimethanol di(meth)acrylate; tripropylene glycol diacrylate; urethane dimethacrylate (UDMA); ethoxylated trimethylolpropane triacrylate;
    trimethylolpropane triacrylate; tris (2-hydroxy ethyl) isocyanurate triacrylate; pentaerythritol tetraacrylate; dipentaerythritol pentaacrylate; dendritic acrylates; and/or mixtures thereof.

* * * * *